United States Patent [19]
Arnetoli

[11] Patent Number: 6,141,879
[45] Date of Patent: *Nov. 7, 2000

[54] CORD TYPE GRASS-CUTTING HEAD WITH MEANS FOR PREVENTING THE ENTRY OF WASTE MATTER

[75] Inventor: Fabrizio Arnetoli, Florence, Italy

[73] Assignee: Arnetoli Motor di Arnetoli Fabrizio, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/962,370

[22] Filed: Oct. 31, 1997

[30] Foreign Application Priority Data

Jul. 18, 1997 [IT] Italy ................... FI97A0171

[51] Int. Cl.⁷ .............. B26B 7/00; A01D 34/67
[52] U.S. Cl. ............................ 30/276; 56/12.7
[58] Field of Search ............ 30/276, 347; 56/12.7, 56/12.5

[56] References Cited

U.S. PATENT DOCUMENTS

| | | | |
|---|---|---|---|
| 4,161,820 | 7/1979 | Moore | 30/276 |
| 4,274,201 | 6/1981 | Oberg et al. | 30/276 |
| 4,310,970 | 1/1982 | Evenson et al. | 30/276 |
| 4,738,085 | 4/1988 | Nishio et al. | 30/276 |
| 4,823,465 | 4/1989 | Collins | 30/276 |
| 4,882,843 | 11/1989 | Baba | 30/276 |
| 4,893,410 | 1/1990 | Hoffman et al. | 30/276 |
| 4,942,664 | 7/1990 | Zatulovsky | 30/276 |
| 4,959,904 | 10/1990 | Proulx | 30/276 |
| 5,095,688 | 3/1992 | Fabrizio | 56/12.7 |
| 5,295,306 | 3/1994 | Sugihara et al. | 30/276 |
| 5,490,641 | 2/1996 | Worthing | 242/587 |
| 5,657,542 | 8/1997 | White, III et al. | 30/276 |
| 5,765,287 | 6/1998 | Griffini et al. | 30/276 |

FOREIGN PATENT DOCUMENTS 0 433 647 A1  6/1991  European Pat. Off. .

*Primary Examiner*—Kenneth E. Peterson
*Assistant Examiner*—Stephen Choi
*Attorney, Agent, or Firm*—McGlew and Tuttle, P.C.

[57] ABSTRACT

The cord-type grass-cutting head includes a container (3, 4) having arranged inside it at least one reel (5) of cutting cord (F), the ends of which emerge from holes in the container, and an operating mechanism for controlled unwinding of the cord from the reel, which mechanism comprise a sliding actuating member (17, 19) projecting from the container, a slit being defined between the sliding member and the container. A flexible protective membrane (33) covers the slit between the sliding member (17, 19) and the container (3, 4).

10 Claims, 3 Drawing Sheets

CORD TYPE GRASS-CUTTING HEAD WITH MEANS FOR PREVENTING THE ENTRY OF WASTE MATTER

DESCRIPTION

1. Technical Field

The present invention relates to accessories for shrub-clearing devices.

More particularly, the present invention relates to a cord-type grass-cutting head of the kind comprising a container or housing, having arranged inside it at least one reel of cutting cord, the ends of which emerge from holes in said container, and operating means for controlled unwinding of said cord from said reel, which means comprise a sliding actuating member projecting from the bottom part of said container.

2. State of the Art

So-called grass-cutting heads equipped with cutting cords projecting from the head are commonly used for cutting grass or shrubs. The head is fitted to the rotating shaft of a shrub-clearing device and is made to rotate at high speed so that the cutting cords radially projecting therefrom act on the vegetation causing cutting thereof.

The cutting cords wear with time and consequently grow shorter. As a result, they must be restored to their working length, by unwinding them in a controlled manner from one or more reels housed in the head container. Several mechanisms have been designed to perform this function, some being automatic (based mainly on centrifugal force) and others manual.

Of these, particularly common are mechanisms which have an actuating member in the form of a cursor or pommel which project from the bottom of the container inside which the reel of cord is housed. During operation, the length of the cord may be restored or modified by pressing the grass-cutting head on the ground so as to push the cursor inwards and thus actuate the members for lengthening the cord.

Grass-cutting heads of this type are described for example in U.S. Pat. No. 5,095,688, U.S. Pat. No. 4,893,410, U.S. Pat. No. 4,882,843 and U.S. Pat. No. 4,823,465.

These heads have the drawback that waste matter from the ground easily penetrates into the slit between the container and the cursor which projects from it and slides relative thereto. This waste matter, consisting of earth and fragments of vegetation, has a high moisture content and, once it has penetrated into the container containing the reel of cord, accumulates there until it blocks up the cord lengthening mechanisms. In order to restore the device to working order, the head must be disassembled and cleaned internally.

OBJECTS AND SUMMARY OF THE INVENTION

The object of the present invention is to provide a grass-cutting head of the type mentioned above which does not have the drawbacks described.

More particularly, the object of the present invention is to provide a grass-cutting head with cord lengthening mechanisms having a member or cursor projecting from the head, in which the accumulation of waste matter is prevented or substantially limited.

These and further objects and advantages which will become clear to persons skilled in the art from a reading of the text which follows are substantially obtained by means of a flexible protection membrane which covers the slit between the sliding member and the container. The membrane allows sliding of the member and at the same time prevents waste matter from penetrating into said container.

Although the sliding operating member for lengthening the cord is normally located in the bottom zone of the head, and in this position the protection member is particularly advantageous, the same type of membrane protection may also be applied onto the top zone of the head, in the case where the sliding member is located on this side, for example so as to be operated by pressure of the foot.

Further advantageous features and embodiments of the head according to the invention are indicated in the accompanying claims and will be described with reference to some examples of application.

BRIEF DESCRIPTION OF THE DRAWINGS

The invention will be better understood with reference to the description and the accompanying drawing which shows a practical non-limiting example of the invention itself. In the drawing.

DESCRIPTION OF EMBODIMENTS OF THE INVENTION

Figure 1:
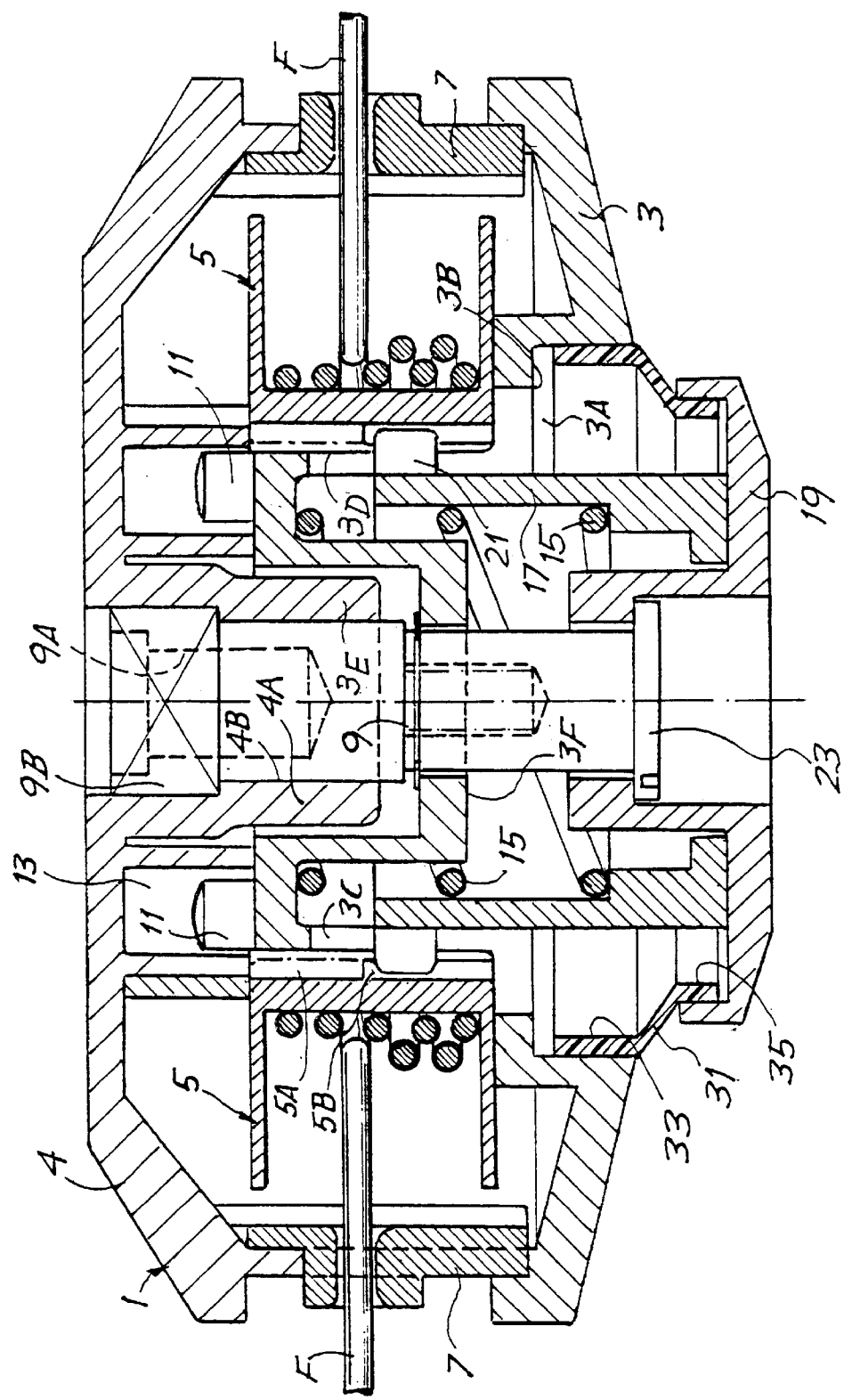
FIG. 1 shows a first embodiment of the invention.

FIG. 1 shows application of the invention to a grass-cutting head of the type described in detail in U.S. Pat. No. 5,095,688. The parts of the head which are of no interest in the description of the present invention, and operation thereof, will be described only briefly. For a more detailed description, reference should be made to the publication mentioned above.

The grass-cutting head, generally denoted by 1, has two covers 3, 4 which define a container, housing inside it a reel 5 onto which a cutting cord F is wound. The ends of the cutting cord emerge from the container 3, 4 through holes formed in perimetral bushes 7 and form the elements which act on the vegetation so as to achieve cutting thereof.

The top cover 4 has internally a sleeve 4A forming a seat 4b for a pin 9 for connection to the rotating shaft of the shrub-clearing device (not shown). The connection may be a screw-type connection, for example consisting of a threaded male member formed on the driving shaft and a female thread 9A formed in the top end of the pin 9. A portion 9B of the pin 9 has a polygonal cross-section for providing a form-fitting twisting connection between the pin 9 and the container 3, 4.

The bottom cover 3 has an inset lower seat 3A, from the end wall 3B of which there extends a cylindrical wall 3C with a plurality of slits 3D. The cylindrical wall 3C terminates at the bottom in an annular portion 3D, from where an additional cylindrical wall 3E coaxial with the wall 3C and terminating in a flange 3F extends.

The annular end portion 3D has integral with it studs 11 which are inserted into corresponding seats 13 formed in the top cover 4, so as to provide a twisting connection between the two covers 3, 4.

In the seat defined by the cylindrical walls 3C, 3E and by the annular end portion 3D there is housed a helical compression spring 15 which acts against the annular portion 3D and a sliding member, or cursor, formed by a sleeve 17 and a plate-piece 19. The sleeve 17 has radial teeth 21 which slide in the slits 3D of the cylindrical wall 3C and project from it radially so as to co-operate with two series of staggered teeth 5A, 5B formed on the internal wall of the reel 5. The sleeve 17 and the plate-piece 19, together with the helical spring 15, are retained by a screw 23 which engages in an axial threaded hole of the pin 9.

That which has been described hitherto is already known from U.S. Pat. No. 5,095,688. Lengthening of the cutting cord F is performed by pressing the plate-piece 19 on the ground, overcoming the force of the spring 15 and thus causing upward sliding of the sliding member formed by the sleeve 17 and the plate 19. As a result, the teeth 21 of the sleeve 17 are disengaged from the teeth 5B of the reel 5 and engage with the teeth 5A which are staggered by half a step. The centrifugal force acting on the cord F causes a corresponding rotation of the reel 5 by half a step. When the grass-cutting head 1 is again raised from the ground, allowing the outward travel movement (limited by the screw 23) of the plate-piece 19 and the sleeve 17, the teeth 21 disengage from the teeth 5A and engage with the teeth 5B, with a consequent further rotation, by half a step, of the reel 5 and a corresponding lengthening of the cord F.

The operation is repeated the number of times necessary to restore the cord F to its desired length.

In order to prevent penetration of waste matter into the space between the plate-piece 19 and the seat 3B formed by the bottom cover 3 defining the container of the reel 5, a conically extending flexible membrane 31 is provided. The membrane 31 is integral with two cylindrical portions 33, 35 with a diameter corresponding to the diameters of the larger base and smaller base of the conical surface of the flexible membrane 31. The cylindrical portion 33 is force-fitted or in any case fixed (for example by means of gluing) in the seat 3A of the bottom cover 3 of the container 3, 4. The cylindrical portion 35 is fixed to the inside of the plate-piece 19.

The assembly consisting of the membrane 31 and the two cylindrical portions 33 and 35 may be obtained as a single moulded piece, using preferably two materials of different rigidity. The membrane 31, which may also have a smaller thickness, is made of more flexible material, while the cylindrical portions 33, 35 are made of rigid or semi-rigid material. Alternatively, the entire assembly 31, 33, 35 may be made using the same material, if necessary in variable thicknesses. In this case the cylindrical portions 33, 35 are fixed to the cover 3 and to the plate-piece 19 for example by means of gluing or by means of welding or in some other suitable manner.

The conical flexible membrane 31 allows the movement of the sliding member 17, 19 and hence lengthening of the cord F, preventing the penetration of waste matter inside the container consisting of the covers 3, 4.

Figure 2:
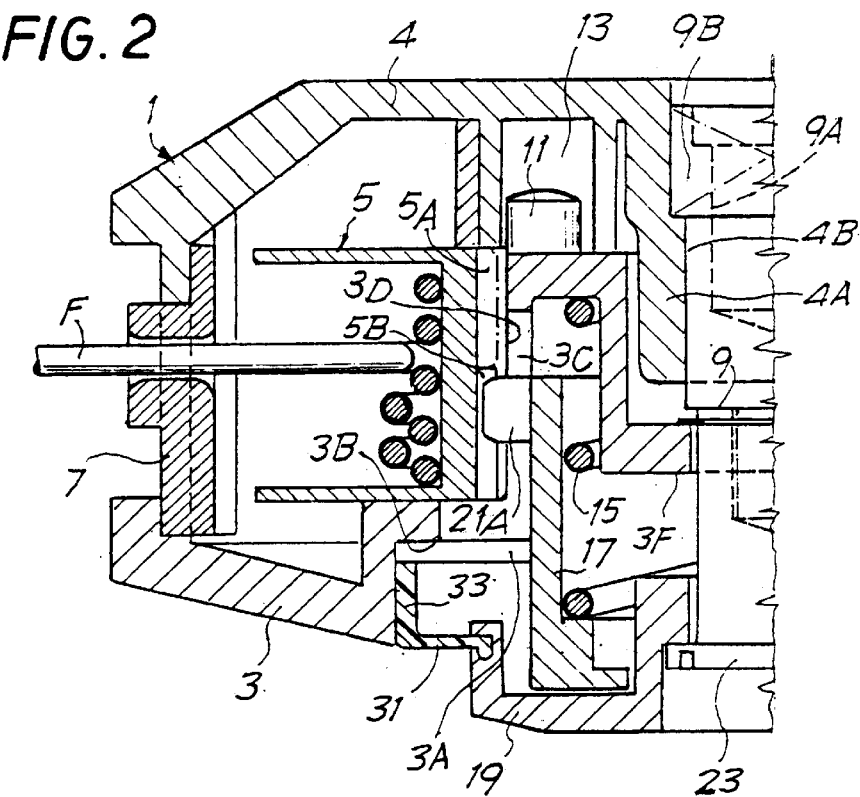
FIG. 2 shows a second embodiment of the invention.

In FIG. 2, where identical numbers indicate parts which are identical or correspond to one another, the membrane 31 is integral with a cylindrical portion 33 which adheres to the cover 3, while on the opposite side it is formed as one piece with the plate-piece 19, for example in a single injection-moulding operation, using plastic materials with suitable characteristics (rigidity, flexibility, thickness).

Figure 3:
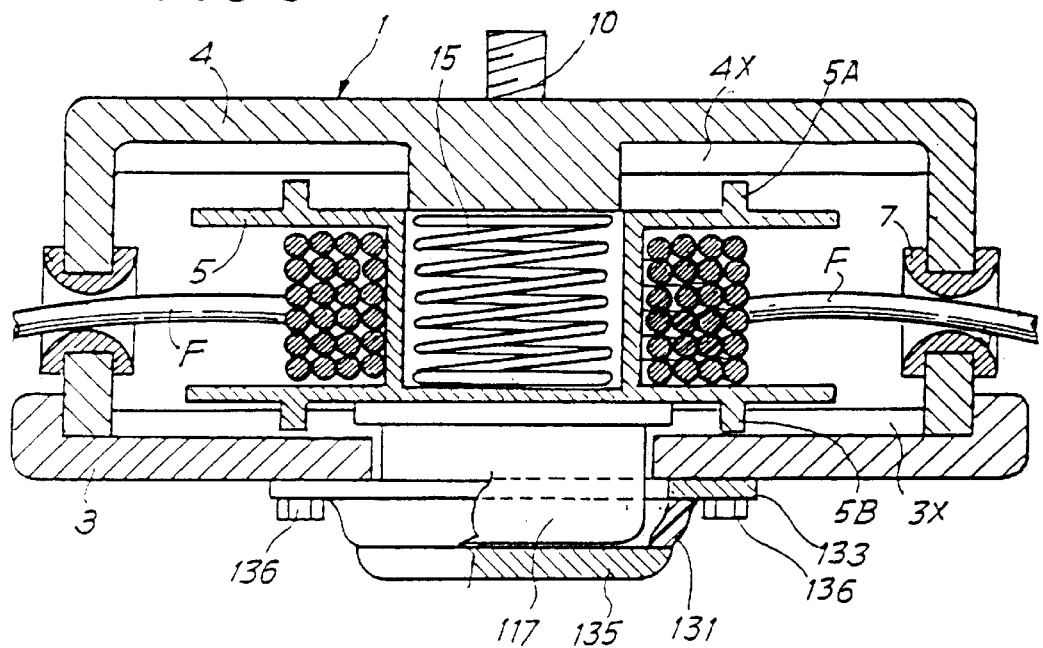
FIG. 3 shows an embodiment where the membrane is in the form of an accessory to be fitted onto existing heads.

FIG. 3 shows application of the invention to a grass-cutting head with a simpler structure. The two covers forming the container of the head 1 are again indicated by 3 and 4, and 5 again denotes the reel of cord F which emerges with its ends from the bushes 7. 10 schematically denotes the end part of the driving shaft of the shrub-clearing device (not shown) which engages in a threaded hole of the top cover 4.

The reel 5 has upper and lower staggered teeth 5A, 5B which co-operate with teeth 4X, 3X of the top and bottom covers, respectively. 15 denotes a helical spring which presses the reel 5 downwards. The reel 5 rests on a sliding member 117 which emerges from the bottom of the cover 3. The sliding member 117 may also be formed as one piece with the reel 5.

In order to avoid penetration of waste matter into the space between the sliding seat of the sliding member 117 and the cylindrical wall of the latter, a protective membrane 131 of approximately conical shape, integral with an annular base flange 133 and a disk 135, is fitted onto the external surface of the bottom cover 3. The annular flange 133 and the disk 135 are made of material which is more rigid and stronger than the material forming the membrane 131. The three components 131, 133, 135 may nevertheless be formed by means of moulding in a single mould using different materials.

The annular flange 133 serves for fitting the membrane 131 to the bottom portion of the container 3, 4. Fitting may be achieved in various ways, for example by means of screws, as schematically indicated by 136, or by means of gluing or moulding. Alternatively an annular seat for force-fitting the annular flange 133 may be provided on the external bottom surface of the cover 3.

The membrane 131, together with the flange 133 and the disk 135, may be also provided in the form of a kit for impromptu fitting to an existing head which has no protection. In this case, the flange 131 may be provided, for example, with holes for self-threading screws for fitting to the cover 3, or else a pressure adhesive, suitably protected by a protective sheet to be detached at the time of use.

Figure 4:
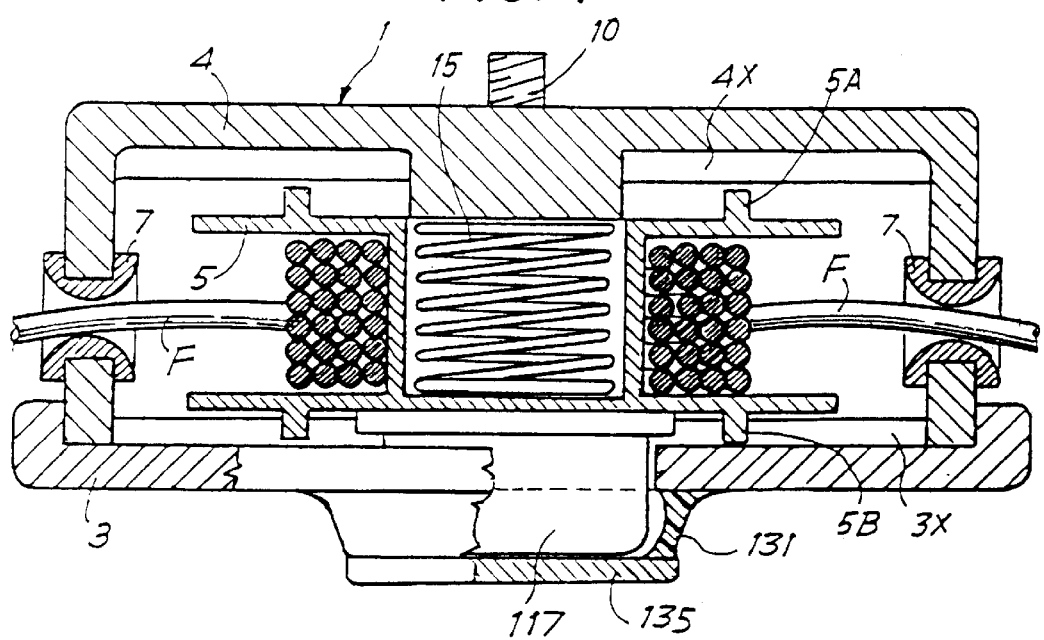
FIG. 4 shows a further embodiment in which the membrane is made as one piece with the bottom portion of the container.

FIG. 4 shows a variation of embodiment of FIG. 3, where the flexible membrane 131 is without an annular flange 133 and is formed as one piece from the bottom cover 3, using a soft and flexible material which is injected into the mould together with the more rigid and stronger material which forms the bottom cover 3 and, if necessary, the plate-piece 135.

In the embodiment shown in FIGS. 3 and 4, the membrane 131 may also be made of the same material which forms the disk 135 (FIG. 4) or of the same material which also forms the plate-piece 135 and the annular flange 133 (FIG. 3). In this case, a different resistance and flexibility may be obtained with different thicknesses of the various parts 133, 135, 131. If a greater resistance to wear is dispensed with, the parts 131, 133, 135 may also all be made of flexible material, in which case the protection assumes the form of a flexible protection cover, the annular edge of which forms the actual protective membrane.

Figure 5:
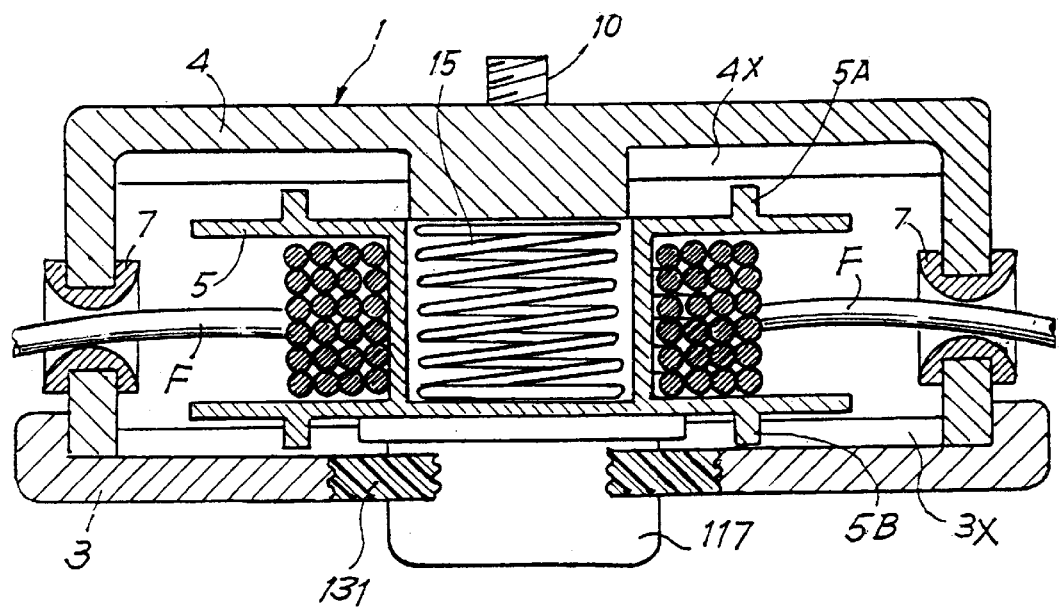
FIG. 5 shows an embodiment in which the membrane is made as one piece with the sliding member and with the wall of the container.

FIG. 5 shows a further embodiment in which the flexible membrane, again indicated by 131, is made as one piece with the bottom cover 3 and the sliding member 117. In this case, both the base flange 133 and the plate 135 are missing.

It is understood that the drawing shows only an example provided by way of a practical demonstration of the invention, it being possible for variations to be made to the forms and arrangements of said invention without thereby departing from the scope of the idea underlying the invention itself. The presence of any reference numbers in the accompanying claims merely has the purpose of facilitating reading of the claims with reference to the description and the drawing and does not limit the scope of the protection represented by the claims.

What is claimed is:

1. A cord-type grass-cutting head including:
   a container;
   at least one reel of cutting cord housed in said container with ends of said cutting cord projecting out from holes in said container;
   a cover arranged on said container;
   at least one aperture with an edge portion in said cover;
   operating means for controlled unwinding of said cord from said reel, said operating means including a sliding actuating member which projects out from said container through said at least one aperture so that a slit is formed between said edge portion of said at least one aperture and said sliding actuating member;
   a flexible membrane having at least a first rim connected to said cover along said edge portion and a second rim connected to said sliding actuating member to seal said slit and block penetration of waste matter into said slit so that said aperture is completely sealed, said flexible membrane being connected to said cover and said sliding actuating member for flexural deformation of said flexible membrane during sliding of said sliding actuating member.

2. A grass-cutting head according to claim 1, wherein said flexible membrane forms a portion of a protective cap fitted onto the cover, which cap covers a sliding seat of said sliding actuating member.

3. A grass-cutting head according to claim 2, wherein said protective cap comprises a substantially rigid annular flange with means for attaching the flange to said cover and a substantially rigid central portion co-operating with said sliding actuating member, said flexible membrane joining said annular flange and said central portion.

4. A grass-cutting head according to claim 1, wherein said flexible membrane is made of plastic material which is molded together with the cover of said container along said edge portion and together with said sliding actuating member.

5. A grass-cutting head according to claim 1, wherein said flexible membrane is made of plastic material which is molded together with the cover and has a central portion co-operating with said sliding actuating member.

6. A grass-cutting head according to claim 1, wherein said flexible membrane has an annular portion and is integrally formed at respective opposite ends with two substantially rigid cylindrical portions fixed to said cover and said sliding actuating member, respectively.

7. A grass-cutting head according to claim 6, wherein said cylindrical portions are engaged with the container and the operating means by force-fitting.

8. A grass-cutting head according to claim 1, wherein said sliding actuating member is made as one piece with said flexible membrane which has an annular extension, means for securing the flexible membrane to said container being arranged along an edge thereof.

9. A grass-cutting head according to claim 8, wherein said securing means consist of a substantially rigid annular portion fixed to said cover.

10. A cord-type grass-cutting head including:
    a container;
    at least one reel of cutting cord housed in said container with ends of said cutting cord projecting out from holes in said container;
    a cover arranged on said container;
    at least one aperture with an edge portion in said cover;
    operating means for controlled unwinding of said cord from said reel, said operating means including a sliding actuating member which projects out from said container through said at least one aperture so that a slit is formed between said edge portion of said at least one aperture and said sliding actuating member, said sliding actuating member including a sleeve and a plate piece;
    a flexible membrane having an inner rim connected to said plate piece and having an outer rim connected to said cover along said edge portion, said flexible membrane sealing said slit thus preventing penetration of waste matter into said slit so that the aperture is completely sealed, while permitting the sliding of said sliding actuating member by flexural deformation of said membrane.

* * * * *